United States Patent
Nulph (10) Patent No.: US 7,247,095 B2
(45) Date of Patent: Jul. 24, 2007

(54) METHOD AND SYSTEM FOR MARKETING AND GAME SELECTION FOR LOTTERY PRODUCTS

(76) Inventor: James L. Nulph, 416 Mallard Dr., Cranberry Township, PA (US) 16066

( * ) Notice: Subject to any disclaimer, the term of this patent is extended or adjusted under 35 U.S.C. 154(b) by 117 days.

(21) Appl. No.: 10/961,783

(22) Filed: Oct. 8, 2004

(65) Prior Publication Data

US 2006/0079311 A1    Apr. 13, 2006

(51) Int. Cl.
*G06F 19/00* (2006.01)
(52) U.S. Cl. .......................... 463/17; 463/42; 273/139; 273/269
(58) Field of Classification Search ............ 463/16–18, 463/40–42; 273/269, 139; 235/375
See application file for complete search history.

(56) References Cited

U.S. PATENT DOCUMENTS

| | | | |
|---|---|---|---|
| 5,010,485 A | | 4/1991 | Bigari |
| 5,222,624 A | * | 6/1993 | Burr ............................ 221/1 |
| 5,223,698 A | | 6/1993 | Kapur |
| 5,239,165 A | * | 8/1993 | Novak ........................ 235/375 |
| 5,256,863 A | | 10/1993 | Ferguson et al. |
| 5,353,219 A | | 10/1994 | Mueller et al. |
| 5,424,524 A | | 6/1995 | Ruppert et al. |
| 5,727,153 A | | 3/1998 | Powell |
| 5,918,213 A | | 6/1999 | Bernard et al. |
| 5,969,968 A | | 10/1999 | Pentel |
| 5,974,393 A | | 10/1999 | McCullough et al. |
| 6,024,640 A | * | 2/2000 | Walker et al. ............... 463/17 |
| 6,208,976 B1 | | 3/2001 | Kinebuchi et al. |
| 6,267,670 B1 | * | 7/2001 | Walker et al. ............... 463/17 |
| 6,386,323 B1 | | 5/2002 | Ramachandran et al. |
| 6,405,182 B1 | | 6/2002 | Cuervo |
| 6,442,530 B1 | | 8/2002 | Miller |
| 6,507,279 B2 | | 1/2003 | Loof |
| 6,543,683 B2 | | 4/2003 | Hoffman |
| 6,571,218 B1 | | 5/2003 | Sadler |
| 6,582,304 B2 | * | 6/2003 | Walker et al. ............... 463/17 |
| 6,607,439 B2 | * | 8/2003 | Schneier et al. ............. 463/17 |
| 6,887,153 B2 | * | 5/2005 | Walker et al. ............... 463/17 |
| 6,932,258 B1 | * | 8/2005 | Roberts et al. ............. 225/103 |
| 7,017,801 B2 | | 3/2006 | Malich |
| 7,024,375 B2 | | 4/2006 | Chau et al. |
| 2003/0199302 A1 | * | 10/2003 | Weiss ......................... 463/17 |
| 2004/0242309 A1 | | 12/2004 | Melesko et al. |
| 2005/0049027 A1 | * | 3/2005 | Weiss ......................... 463/17 |
| 2005/0233797 A1 | | 10/2005 | Gilmore et al. |

* cited by examiner

*Primary Examiner*—Robert E. Pezzuto
*Assistant Examiner*—Alex F. R. P. Rada, II
(74) *Attorney, Agent, or Firm*—The Webb Law Firm (57) ABSTRACT

A game selection device for use in a lottery system includes data storage for a plurality of game types, information corresponding to each of the game types, and at least one play option corresponding to one or more of the plurality of game types. The game selection device further includes a user interface configured to display the plurality of game types and at least one play option associated with each game type, receive a game type selection input from the user, and receive a play option selection input from the user. Additionally, the game selection device includes an encoder for encoding the user's selections as a code. A code writer writes the code onto a play card. Also disclosed, is a scanning device to scan an enhanced bar code. A method of utilizing the aforementioned game selection device is also disclosed.

28 Claims, 5 Drawing Sheets

METHOD AND SYSTEM FOR MARKETING AND GAME SELECTION FOR LOTTERY PRODUCTS

BACKGROUND OF THE INVENTION

1. Field of the Invention

The invention relates to systems and methods for marketing lottery games through a game selection device, where the device is not necessarily in communication with a lottery sales device or a central lottery system computer.

2. Description of Related Art

Figure 1:
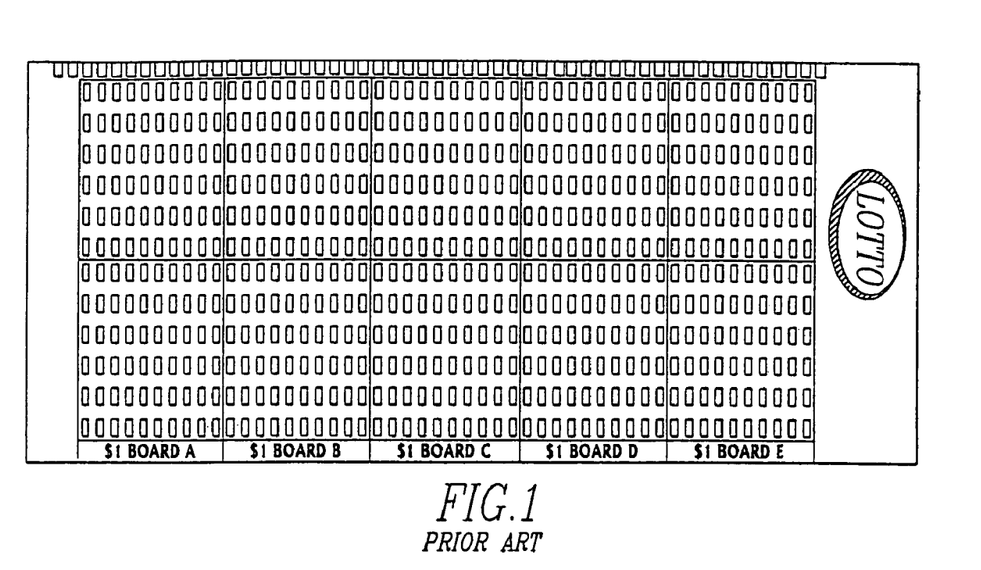
FIG. 1 is a front view of a prior art play slip for a lottery drawing numbers game.

A large number of states in the United States, as well as several foreign countries, have government-run lotteries. A form of legalized gambling, these lotteries are almost all very similar in the format of a main lottery game often known as "lotto". These games are usually based upon a combination of numbers selected by a player from a predetermined number range, which, in combination with the amount of numbers selected for a particular game, establish the desired odds for that game. The player may indicate his or her number selections by filling out corresponding spaces on a play slip, such as the prior art play slip depicted in FIG. 1. The number selections of the play slip are then read by a lottery sales device operated by a clerk. Numbers may also be randomly selected by a lottery sales device, in what is known as a "quick pick" or entered by the clerk through a keyboard attached to a lottery sales device. A subsequent state lottery drawing determines the winning numbers for that particular game. Such drawing games may occur weekly or more frequently. Because these types of "lotto" games are played through a lottery sales device in online communication with a central lottery system via a network, these game types are referred to as "online" games.

In the typical lottery jurisdiction, a large central lottery system computer is linked by telephone line and modem with all retail lottery sales devices in the system. The lottery jurisdiction usually leases or purchases the lottery sales devices and other requisite hardware and places a telephone line into each participating store. The retailer is sometimes charged a fee for installation and a periodic service charge. Serialized paper stock is typically provided by the lottery system to each participating store. In the typical system, all lottery numbers, whether selected by the player or quick picks, are transmitted to the lottery system computer at the time of purchase. A serial number is assigned and printed on each lottery ticket, which is used to uniquely identify all plays on the particular lottery ticket. One method is to use the serial number as a pointer to an electronic record of each transaction kept on the central lottery system computer, wherein each record includes the serial number, the selected numbers, the retailer, etc. This record is maintained for the duration of the game being played, with all "winners" maintained in the central computer for redemption at a later date. In current lottery systems, a ticket printer forms a part of a self-standing lottery sales device, which also includes a keyboard, a display, an optical reader, and a modem. The terminal's ticket printer typically prints a bar code that is used by the optical reader of the dedicated lottery sales device to represent a serial number or look-up number as discussed above, for the numbers selected for a particular game.

The great bulk of lottery ticket sales have in the past been generated by convenience stores or small grocery stores having only a single checkout line. Few supermarkets have more than one lottery sales device due to the problem of outfitting every checkout line with a separate lottery sales device. Additionally, the checkout clerk of each checkout line would be required to be trained in and perform an additional function separate from the normal sale of store inventory items. Furthermore, by integrating the entire lottery transaction into each checkout line, the checkout procedure would be slowed, thereby annoying other customers.

U.S. Pat. No. 5,239,165 to Novak (hereinafter "the Novak patent") discloses a bar code lottery ticket handling system which attempts to overcome the aforementioned problems by having the player select lottery numbers at a pick stand situated remotely from the lottery sales device. The pick stand issues a play slip that may then be taken by the player to any non-lottery POS (point-of-sale) terminal to be read and thereafter to have a lottery ticket printed for the player. Specifically, the Novak patent discloses a system in which lottery transactions may be integrated into checkout lines by having a proprietary device installed between a standard bar code scanner and the POS terminal, so that a play slip bar code may be distinguished from any store-inventory bar coded items, and processed accordingly.

However, the system disclosed in the Novak patent suffers from numerous problems, such as requiring the retrofitting of existing POS systems to accommodate the proprietary device. Thus, installation of such a system would entail costly mechanical and electrical modifications. Additionally, new communication links need to be established from the physical location of the proprietary device of each checkout line to a modem that is configured to transmit lottery information to the central lottery system computer. Thus, additional time and money is required to install the requisite communication cables and routing equipment. Another drawback to utilizing the system of the Novak patent involves the limitations of the game selection device, or the pick slip stand, as described in the Novak patent. Specifically, the pick slip stand is limited in the type of games that may be selected therefrom and thereafter expressed on the play slip. Thus, the pick slip stand only offers traditional lottery drawing games and, therefore, is quite limited in the playability and amusement value of lottery games offered to players. One having ordinary skill in the art would understand that traditional lottery drawing games refer to games including, but not limited to, games having a single pool or multiple pools of numbers from which either a set or series of numbers are drawn. Yet another drawback to such a system arises from the requisite interaction of the proprietary device installed between a standard bar code scanner and the POS terminal. Namely, such a system cannot be installed outside of supermarket environments, such as entertainment venues and non-retail locales that do not have the requisite existing POS systems.

Essentially, the system of the Novak patent requires a replication of the hardware inherent in an ordinary standalone lottery sales device into a POS system. The pick stand assumes the role of the checkout clerk traditionally responsible for entering the games to be played into the standalone lottery sales device. The utility of such a system is only appreciated after taking into account the costs of implementation of such a system. It is evident that the system of the Novak patent is not prevalent in supermarkets and the like because the benefits received by implementing such a system do not outweigh the associated costs and burdens, as outlined above.

With the increase in the number of lottery games and corresponding play options available, lottery sales transactions are becoming more complicated transactions that require multiple selections for each wager. Common examples include, but are not limited to, game type, numbers played, wager type, amount wagered, and drawing date. It is estimated that 30%-60% of players purchase more than one game at a time. In many cases, players speak their selections, which require sales clerks to key the selections manually into the lottery sales device. In such cases, the game types selected are limited by the ability of the clerk to process a wide variety of play options with sufficient speed to satisfy lottery transaction throughput requirement. For any play slip entry process, the game type is limited by not only the variety of play slips that can be realistically displayed to offer all game options, but also by the limitations inherent in the range of numbers or symbols that an be printed on the play slip.

Thus, there remains a need for a system and method for marketing lottery games in an expedited fashion while minimizing the amount of additional hardware/software and modification thereof that is necessary to implement such a system. Additionally, there is a need for providing a wide variety of traditional and non-traditional game types from which a player may select, wherein such game selection is facilitated outside the presence of a clerk, especially in diverse establishments and venues or perhaps even at home.

SUMMARY OF THE INVENTION

To overcome the deficiencies of the prior art, what is needed, and has not heretofore been developed, is a system and method for marketing lottery games through a game selection device situated in any establishment or venue that neither needs to be in communication with a lottery sales device nor a central lottery system computer. Nor does the system have to be within eyesight of a store clerk, for age verification purposes.

Accordingly, a lottery system for game selection by a user includes a game selection device, wherein the game selection device includes data storage for a plurality of game types, information corresponding to each of the game types, and at least one play option corresponding to one or more of the plurality of game types. The game selection device further includes a user interface configured to display the plurality of game types and at least one play option associated with each game type, receive a game type selection input from the user, wherein the game type selection input corresponds to at least one of the plurality of game types selected by the user, and receives a play option selection input from the user, wherein the play option selection input corresponds to the at least one play option associated with the at least one of the plurality of game types selected by user. Additionally, the game selection device includes an encoder for encoding the at least one of the plurality of game types and the at least one play option as a code. Also, a code writer of the game selection device is configured to write the code onto a play card.

In operation, the game selection device encodes on a play card the details of the lottery games selected by the player and the bar code. The player then takes the play card to any lottery sales device to complete the lottery transaction. The play card is scanned by the lottery sales device and the encoded information of the bar code is transmitted to the central lottery system computer for processing. The lottery sales device then prints a lottery ticket for the player, which evidences the details of the lottery transaction.

The present invention allows a limitless amount of games to be played in locations not ordinarily associated with or conducive to lottery game playing. Use of the present invention increases the efficiency of the lottery transaction process by allowing multiple game selections to be processed through a lottery sales device by way of a single data input, thereby eliminating any inconveniences associated with current multiple data input game selection transactions. Additionally, placement of the game selection device outside of locations where the lottery sales device is placed facilitates impulse game transactions, thus increasing sales. Due to game selection devices not requiring monitoring for purposes of age control, the game selection devices may be situated in most any location. Game selection devices are also useful for supporting advanced tutorials. Thus, players who do not know the game play fundamentals of a particular game type may utilize the game selection device without fear of being embarrassed by a clerk or someone waiting his or her turn at the lottery sales device as the player waits for the clerk to process his or her game selection. Furthermore, the present invention supports the creation of advanced lottery marketing tactics, and sale of new types of lottery games that may not be ordinarily sold using existing game selection processes.

The present invention also includes a scanning device configured to scan alternative bar code formats or smart cards that would not be ordinarily compatible with existing lottery sales devices. These bar code formats or smart cards represent or store game types, corresponding play option data, or other player input such as player identification numbers or responses to lottery surveys. The scanning device may be used in conjunction with existing lottery sales devices to translate the data into a format or data that is compatible with data protocols used by the existing lottery sales device. The scanning device may then transfer the translated data to the existing lottery sales device. The translated data may then be processed by the existing lottery sales device in a similar manner as the existing lottery sales device would process data received from traditional inputs, such as standard manually marked play slips by the lottery player or manually keyed input by the lottery sales clerk.

These and other advantages of the present invention will be understood from the description of the preferred embodiments, taken with the accompanying drawings, wherein like reference numerals represent like elements throughout.

DETAILED DESCRIPTION OF THE PREFERRED EMBODIMENTS

The present invention will now be described with reference to the accompanying figures. It is to be understood that the specific system illustrated in the attached figures and described in the following specification are simply exemplary embodiments of the present invention.

Figure 2:
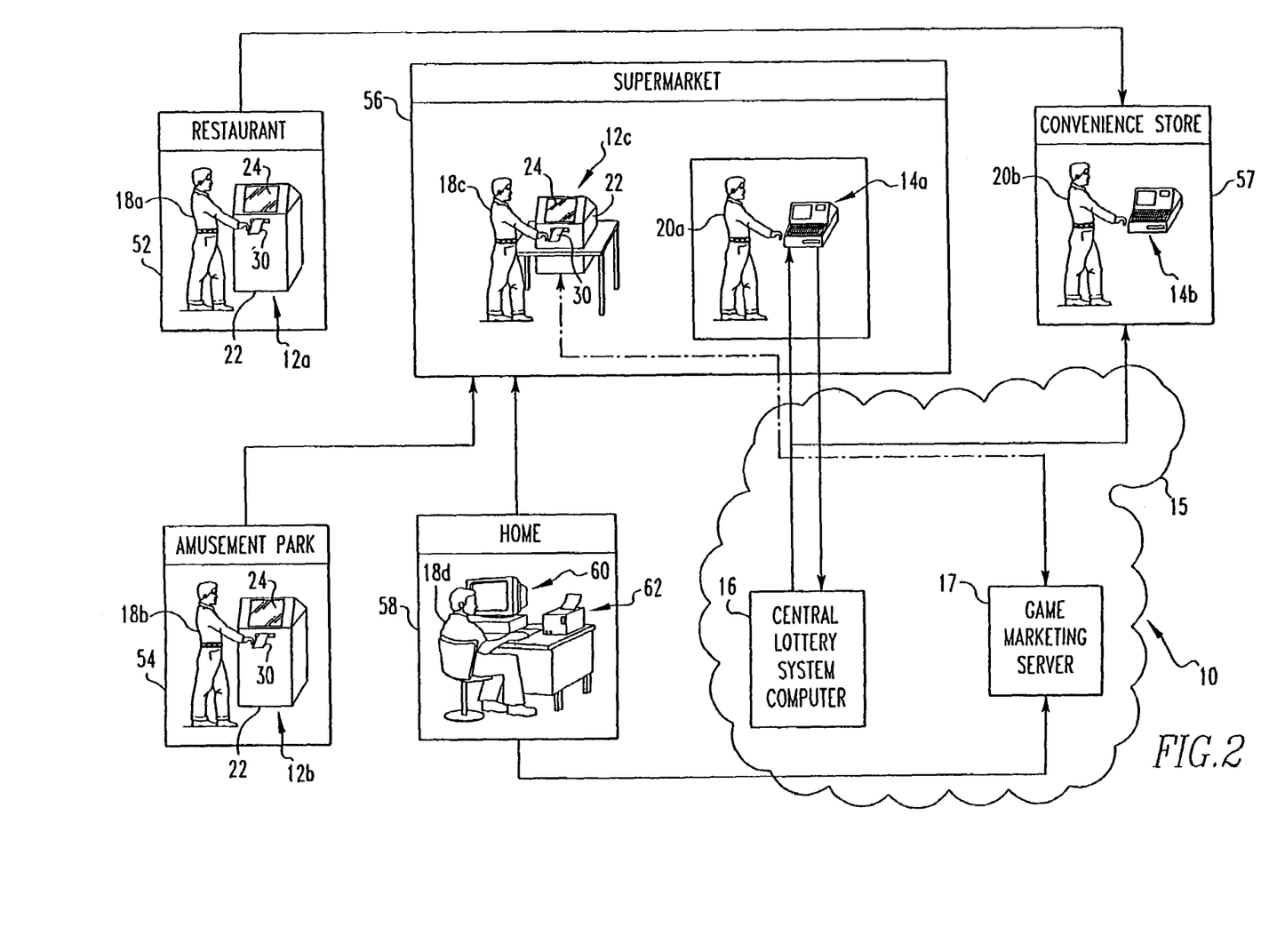
FIG. 2 is a schematic view of entities in a lottery system in accordance with the present invention.

With reference to FIG. 2, the entities and the relationship and communicative connectivity between the entities in a lottery system 10 is shown. In the preferred embodiment, the lottery system 10 includes one or more game selection devices, such as game selection devices 12a, 12b, and 12c, one or more lottery sales devices, such as 14a and 14b, a computer network 15, a central lottery system computer 16, and a game marketing server 17. It is intended that any of the game selection devices 12a-c are to be interacted with by any lottery player, such as players 18a, 18b, 18c, and 18d. It is intended that any of the lottery sales devices 14a, 14b are interacted with by respective personnel, such as clerks 20a, 20b, of a respective establishment or venue in which the lottery sales devices 14a, 14b are operated. It is to be understood that the lottery system 10 may include additional game selection devices, lottery sales devices, players, and clerks, and that game selection devices 12a-c, lottery sales devices 14a, 14b, players 18a-d, and clerks 20a,20b are depicted for exemplary purposes only.

Desirably, each of the game selection devices, such as game selection device 12a, for example, is a stand-alone electronics device having a body 22 of dimensions conducive to the environment in which the game selection device 12a operates. For example, if the game selection device 12a is intended to be used in an open-space area, then the game selection device 12a is dimensioned so that it extends from a floor surface to a height level conducive to interaction with respective player 18a. If the game selection device 12a operates in a remote area not necessarily having an immediate A/C supply, the game selection device 12a may also receive its requisite operating power from a battery installed internal or external to the body 22.

The body 22 of a typical game selection device 12a includes a computer system (not shown) for storing a variety of lottery game types and information and options corresponding to each of the game types. For example, in addition to traditional state-wide lottery drawing games, as are well known in the art, the game types stored within the game selection device 12a may include, but are not limited to raffle games, regional non-statewide games, multi-jurisdiction games, permutation games, non-number games, combination games, and instant win online games. The game selection device 12a may also be configured to allow changes in game offerings and marketing program structures relating to content and information displayed on the game selection device 12a. The game selection device 12a may also support collection and analysis of player input such as play options, survey responses, contests, etc, to increase the effectiveness of lottery marketing and game development programs.

The present invention supports a lottery's ability to enhance its game offerings in a number of ways. This includes, but is not limited to new game structures, co-branded games with licensed properties, co-branded games with product brands, and co-branded games with retail brands. These enhanced games are a result of the system's ability to display a theoretical limitless variety of game types and process a theoretical limitless variety of game play selections than the current manual processes. The above-identified enhanced games will now be discussed in more detail, although it is to be understood that the following discussion is not intended to limit the types of games that may be offered in connection with the system.

New Game Structures:

"Pick Your Number" Raffle Games:

Lotteries have sold raffle type games in the past, however past raffle game structures require players play the number selected for them by the lottery system. This requirement exists because there is no way to communicate to players what numbers have already been played. The ability of the present invention to process a wider variety of game play selections would allow the lottery to offer the player a real time display of all raffle numbers not yet played thus allowing players to select the raffle number of their choice. Thus, it is to be understood that the present invention removes already played numbered raffle numbered tickets from a pool of available raffle tickets. The ability to choose the numbers they play enhances the positive experience the player has with the game thus increasing game sales.

Customized Regional Games Including, but not Limited to Raffle Games:

Raffles are popular game types. One of the reasons for their popularity is that they are scaled to the region where they are played. For example, a charitable raffle for a local fire department that gives away a car works well because raffle players are competing for the prize only with those in their region. Because of the difficulty of customizing games to regions, state lottery games are almost always statewide. The ability of the present invention to display a wider variety of game types allows easy implementation of numerous regional games of either a raffle type or other type such as a mini-lotto type. This ability allows the lottery to design and sell games specific to a region, retailer (e.g., 7-11). It also allows the lottery to sell short run, high price games such as the $50 a ticket raffles that are frequently run when car or other merchandise prizes are given away through charitable raffles.

Permutation Games:

Most high prize lottery games are based on players selecting from a combination of numbers such as picking 6 of 49. These games are based on combination calculations and do not allow the same number to be selected twice. The present invention's ability to process a wider variety of game selections allows lottery games to be based on per-mutation calculations thus allow a number to be selected twice. For example, this same 6 of 49 game based on a permutation calculation would allow a player to select the same number more than once.

The reason these games do not currently exist is that the game selection processes would be too unwieldy to allow players to repeat selection of the same number from a large number matrix. Normal game selection processes use a play slip and these play slips have limited space. A 6 of 49 permutations game would require six fields of 49 on one play slip. This is impractical since current play slip designs can support up to ten 49 number files thus allowing the processing of $10 worth of game selections, $1 per selection. A 6 of 49 number permutation game would allow no more than $1 worth of game selections, because the play slip would need to display six 49 number matrices per $1 play. The limit is 10 matrices.

The reason permutation games are desirable is that they allow the lottery to offer long odds, big prize games with a reduced matrix size versus combination games (the matrix represents the number of numbers a player from which a player can select). For example, the odds of correctly matching 6 of 49 using combination style game structure is 1 in 13,983,816. For a permutations style game, the matrix to deliver the same long odds can be much smaller, thus, increasing sales by creating the perception that the game is much easier to win. For example, to create a 1 in 14 million odds game with a permutation style game a more favorably perceived 5 of 27 games can be sold.

Cash Pyramid Permutation Game Example:

By facilitating permutation game types, the present invention opens up a whole range of game types not currently feasible under the existing manual game selection process. One example is Cash Pyramid. Players play this game by selecting the number they think will be drawn for each part of the pyramid. For each level, the player matches in exact order to the number drawn the player wins a prize. One possible game matrix would look like this:

```
         1
        2 3
       4 5 6
      7 8 9 10
    11 12 13 14 15
```

This game may cost $5 game or some other more substantial number in relation to a traditional lottery game. Odds of matching the top tier number would be 1 in 15 and pay a $7 prize. Odds of matching the second tier numbers in exact order would be 1 in 210 and pay a $100 prize. Odds of matching the third tier numbers in exact order would be 1 in 2,730 and pay a $1,500 prize. Odds of matching the fourth tier numbers in exact order would be 1 in 32,760 and pay a $15,000 prize. Odds of matching the fifth tier numbers in exact order would be 1 in 360,360 and pay a $150,000 prize.

"Non-number" Lottery Games:

The present invention provides lotteries with the ability to sell lottery games based on objects other than numbers. Examples are:

Color based games that awards players prizes for selecting the order in which colored balls are drawn. Color based games are impractical with current manual entry lottery systems because the play slips are limited to colors such as pink, red, or yellow . . . colors that can be ignored by the optical readers used to scan these play slips. Shape-based games that award players for predicting the location within a grid where a shape may be placed. Manual entry systems do not easily support shape-based games because of how tiny the characters must be if they are placed on a play slip. Nor do the manual entry systems allow a game that would be based on placement of a character in a certain grid location as it is difficult for manual entry systems to translate a grid into a play slip format.

Secure Instant Win Online Games:

Instant win scratch-off games rely on a latex covering to protect game symbols from being previewed and winners picked from tickets sold. Online versions of instant games are possible by printing these same play symbols on the online game ticket stock. However, there are a number of difficulties to making the online instant games practical. The first difficulty is that online instant games do not have the graphic appeal of scratch-off instant games because online games are printed on paper receipts in black and white, whereas scratch-off games are printed using multi-color printing presses. The present invention addresses this difficulty by displaying multi-color instant win online game graphics on the touch-screen portion of the game selection device.

The second difficulty is that online instant games are difficult to display under normal circumstances. That is because the online games are sold from a lottery sales device that has limited display capabilities. This contrasts to scratch-off instant games that are sold through transparent displays. One of the reasons scratch-off instant games are successful is these displays stimulate an impulse purchase, something lacking with existing online instant games. The present invention addresses this difficulty by displaying the game graphics on the touch-screen portion of the game selection device thus stimulating the impulse of instant win online games.

The third difficulty is that once an online instant game is printed from the sales device an unscrupulous retailer can palm winning tickets and replace them with a losing ticket without the player knowing the difference. The present invention addresses this difficulty by printing identification numbers on the bar coded play card that will also be printed on the instant win online game. This link between the bar coded play card and the instant win online game provides the player with the ability to detect palming by comparing the number on the player's play card and the number on the instant win online ticket.

Personalized Game Structures:

Players enjoy selecting the game structure that offers the type of prize they find most appealing. Current manual systems cannot support sufficient variety of game selection to satisfy this desire because of the physical display limits and costs of producing a large variety of play slips and because of the burden it would place on sales throughput if sales clerks were to wait to enter game selections while players ponder their preferred game variations. The present invention allows unlimited game selections, thus allowing lotteries to offer sufficient game content selections that the players can customize game selections to match their interests. This would include game prize structures (short odd games with small prizes, long odd games with large prizes) game prizes other than cash (vacations, cars, services), and size of wager (small wagers on multiple sets of numbers, larger wagers for larger prizes).

Frequent Drawing and Quadrant Games:

Lottery Keno-type game are drawn every five to fifteen minutes depending on the state. These drawings are held at the lottery central site and broadcast for display on in-store monitors located in retail establishments that sell the lottery Keno games. This invention allows new types of game content for this frequent drawing, monitor-based gaming system. One such game type is a quadrant game, which for exemplary purposes is entitled "$1,000,000 Treasure Hunt." This game is played by having players select ten of 100 possible quadrants where a treasure may be buried. Treasure is buried under 25 quadrants. This creates a 10 of 25 of 100 game matrix. The quadrant map is made up of 10×10 square. To play the game via this invention the player selects the ten quadrants where they believe the treasures will be buried by touching the quadrants on the touch screen input of the game selection device. Each quadrant is then assigned quadrant number from 1,1 to 10,10.

The prize structure of such a game may be as follows:

| Match | Odds 1 in: | Prize |
|---|---|---|
| 10 | 5,295,680.00 | $1,000,000.00 |
| 9 | 112,974.00 | $1,000.00 |
| 8 | 5,767.00 | $100.00 |
| 7 | 533.00 | $10.00 |
| 6 | 80.00 | $5.00 |
| 5 | 19.00 | $2.00 |
| 4 | 6.80 | $1.00 |

The drawing for such a game would be held in-between Keno-type games, thereby adding incremental gaming content to what is, in the vast majority of states, a gaming system that features only Keno-type games. Players would win by matching the quadrants they predicted contained the buried treasure against the winning quadrants revealed on the game monitor.

By supporting quadrant games and other possible game types this invention significantly increases the game content that can be created for these frequent draw monitor based lottery systems. Other, more complex game types such as three-dimensional quadrants could be created and, though complex in design, could be presented in a simple, easily understood format through this invention.

Currently, game selection input processes via ordinary play slips cannot support this game since the game requires two 1 to 10 number columns for each of the ten quadrants selected. A $1 play for this 10 quadrant game would require a play slip with 200 selection boxes to cover all 10 possible quadrant selections. This exceeds the number of play slip selection boxes per wager spend ratio that lotteries find acceptable. Normally, play slips support a minimum of $5 wager per playslip. The maximum wager of this game that could be placed on one playslip is $1. Thus, utilizing a prior art play slip would result in the clerk input for this game to be time consuming and difficult. Additionally, the manual clerk entry of this game type through lottery sales device keyboards would be difficult because of the challenges of verbally communicating complex game selections. Furthermore, it would be time consuming due to the time required for the manual entry of game selections.

It is to be understood that a quadrant-based game play system allows for branded quadrant-based games, such as Battleship® or Concentration®.

Co-branded Games with Licensed Properties:

Scratch-off games have successfully integrated licensed properties into game design. This has been done because the scratch-off games can represent the key icons from the licensed properties through the colored images printed on the scratch-off tickets. Online ticket printing processes do not allow colored image printing. The present invention overcomes this weakness in online ticket printing by allowing the key icons from the licensed properties to be displayed in color on the touch-screen of the game selection device.

Co-branded Names with Product Brands:

Branding lottery games with well-regarded product brands (e.g., Pepsi®, Frito Lay®, etc.) is an underdeveloped opportunity. The opportunity is underdeveloped because these product branded games require the lottery to match the sale of the games with the retailers that sell the product brands. The present invention allows game content to be displayed and distributed down to the individual retailer, something that is logistically difficult and cost ineffective with manual systems.

Co-branded Games with Retail Brands:

Branding lottery games with well-regarded retail brands (e.g., 7-Eleven®, Wal-Mart®, etc.) is an underdeveloped opportunity. The opportunity is underdeveloped because these retail branded games require the lottery to match the sale of the games with the store locations of the targeted retailer. The present invention allows game content to be displayed and distributed by retail type, something that is logistically difficult and cost ineffective with manual systems.

Corresponding information for each game type may include, but is not limited to cost of play, odds, payout, and drawing/play date, if applicable, for each game type. Corresponding options for each game type may include, but are not limited to numbers or objects to be played, drawing dates to be played, amount of game types to be played, and amount to be wagered. It is to be understood that data storage devices conducive to storing data representative of and relating to the above-described game types and information and options corresponding to such game types is well known in the art and may include, but is not limited to hard disk, optical disc, and various memory storage devices.

The body 22 of the game selection device 12a also includes a user interface, such as a touch-screen interface 24, which is configured to display the game types and information and options corresponding to the game types. The touch-screen interface 24 is also configured to receive tactile input from the player 18a and communicate the input to the computer system of the game selection device 12a. Such input is associated with the selections the player 18 makes in regard to the game types to be played, information displayed for each game, and options chosen for each game, if applicable. It is to be understood that the user interface may include softkeys generated on a monitor, a graphical user interface utilizing a mouse or trackball, or any other suitable interface conducive to communicating the input to the computer system and relating information back to the player 18a.

The computer system includes an encoder (not shown) or other functionally equivalent device configured to encode the game types selected by the user into a machine-readable code, such as a bar code or alphanumeric code. Specifically, the code is representative of the lottery game types and options corresponding to each of the game types. The interface between computer systems and touch-screen interfaces is well known in the art and will not be discussed herein.

The body 22 further includes a code writer, such as a printer (not shown) or other functionally equivalent data-to-print medium transfer device communicatively connected to the computer system. It is envisioned that the printer is encased within the body 22. Blank play cards, optionally listing only non-lottery transaction specific information thereon (e.g., lottery header and footer information), are desirably also contained in the body 22 and are accessible to the printer. The blank play cards may exist as either individual print media or singular rolled print media (e.g., thermal paper) that may be fed into the printer and cut as needed. The blank play cards are utilized by the printer to print information pertaining to a specific lottery transaction of the player 18a. In an alternative embodiment, the play cards may be player cards or smart cards having flash memory, a magnetic strip, or other data storing capacity. In this instance, the printer would be substituted with a suitable code writer for writing to the player card or smart card.

Figure 3:
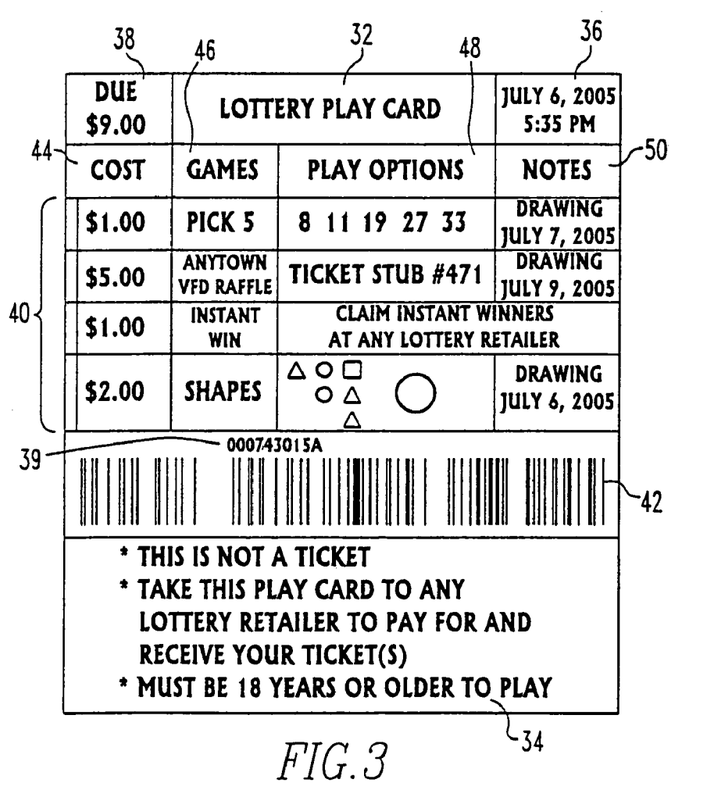
FIG. 3 is a front view of a play card in accordance with the present invention.

With continuing reference to FIG. 2, an exemplary printed play card 30 is depicted in detail in FIG. 3. The play card 30 may designate a variety of information in relation to a specific lottery transaction by the player 18a. Such information may be arranged in organized fields allowing the information to be easily readable. As previously mentioned, information that may be pre-printed on the play card 30 may include, but is not limited to an identifying header 32 and informative footer 34. Information printed in relation to the specific lottery transaction of the player may include a date/timestamp 36 of the transaction, a total cost of play 38, a player identification code 39, a listing 40 of game types played and the corresponding options selected by the player 18a for each game type, and a bar code 42. Information specific to the listing 40 may include, but is not limited to a cost 44, a name 46, play options 48, and notes 50 relating to each game type played.

For example, as shown in FIG. 3, the identifying header 32 indicates "Lottery Play Card" and the informative footer 34 provides lottery rules and regulations. The date/timestamp 36 indicates that the play card 30 was printed on "Jul. 6, 2005 at 5:35 PM". The total cost of play 38 for the play card 30 is "$9.00". The player identification code 39 is "000743015A". As indicated in the listing 40, the names 46 of the game types selected by the player 18a are "Pick 5", "Anytown VFD raffle", "Instant Win", and "Shapes". The cost 44 for each of these games is "$1.00", "$5.00", "$1.00", and "$2.00", respectively. The corresponding play options 48 for these games is "8 11 19 27 33", "Ticket Stub #471", N/A, and a pattern of shapes, respectively. The notes 50 indicated that the drawing dates for each respective game type are "Jul. 7, 2005", "Jul. 9, 2005", N/A, and "Jul. 6, 2005". All or selective portions of the above human readable substantive information is encoded as machine-readable information in the form of the bar code 42. Thus, the game selections and the player identification code may be encoded into the bar code 42. It is to be understood that the bar code 42 may include but is not limited to traditional bar codes, such as the bar code depicted in FIG. 3, or the bar code may be of a two-dimensional type bar code, such as a PDF417 bar code, which allows for more data to be represented as well as providing built-in data error-correction. For example, a traditional bar code may not be able to accommodate the data representative of the game types and corresponding play options that are selected by a player. Instead of the actual game types and the corresponding play options encoded as a bar code, the bar code would include a look-up number. In this instance, upon scanning of the bar code, the look-up number would be transmitted to a remote look-up table to access the game types and the corresponding play options associated with that particular play card. Alternatively, a PDF417 bar code may be able to store all the data within the actual bar code, thus not requiring the use of a look-up table to retrieve the various game types and corresponding play options. In any case, look-up tables and access methods related thereto are known in the art and are therefore not discussed herein.

Returning to FIG. 2, the construction and function of lottery sales devices, such as lottery sales device 14a, is well known in the art and will, therefore, not be discussed herein. However, it is to be understood that in addition to scanning traditional play slips, the lottery sales device 14a is configured to scan the bar code 42 of the play card 30. Furthermore, the lottery sales device 14a is configured to utilize the encoded bar code information scanned from the play card 30 to associate the corresponding lottery transaction information with the player identification code 39 that is inputted into the game selection device 12a by the player 18a when the player 18a makes his game selection or play options and desirably before each game selection or play option session.

As shown in FIG. 2, the lottery sales device 14a may be communicatively connected with the central lottery system computer 16 through the computer network 15. However, as there is no network connectivity between the game selection devices 12a-c and the lottery sales devices 14a, 14b, the game selection devices 12a-c are not in communication with the central lottery system computer 16. The lottery sales device 14a is configured to transmit the electronic player identification code 39 with the corresponding play option data to the central lottery system computer 16. The central lottery system computer 16 is configured to receive the electronic player identification code 39 and corresponding play option data and store them, desirably as a player record, in a database. It is to be understood that the lottery transaction of the player 18a, specifically, the game types and play options, may be associated with the player identification code 39 and may be retrieved from the database at a later time for purposes such as direct marketing to each individual player.

As previously mentioned, the player identification code 39 and associated play option data may also be printed by the game selection device 12 in the form of the play card 30, so that the game types and the play options played by the player 18a are printed thereon. It is also envisioned that the same information may be transferred by the game selection device 12 to a smart card and stored thereon desirably as digital data. Alternatively, the player 18a may be issued a player card, similar to a credit card, which includes an identifier that is associated with the electronic player record of the computer system. It is to be understood that the game selection device 12 may be adapted to accept smart cards and player cards that have been encoded with the player's play options at a game selection device adapted for interfacing with such digital storage cards.

Each of the game selection devices 12a-c may be situated in various establishments and venues, such as restaurants 52, amusement parks 54, and supermarkets 56, as shown in FIG. 2. As there is no network connectivity between the game selection devices 12a-c and the lottery sales devices 14a, 14b, each game selection device 12a-c may be placed in remote locations far from the lottery sales device 14a, 14b. Therefore, in addition to being situated in supermarkets, the game selection devices 12a-c may be located in restaurants and amusement parks, for example. Some venues, such as supermarkets 56 may include both a game selection device 12c and a lottery sales device 14a, whereas other venues, such as a convenience store 57, may only have the lottery sales device 14b. In an alternative embodiment of the present invention, a home 58 may contain a personal computer 60 and a printer 62 accessible to the player 18d in order to serve as a functional equivalent to any of the game selection devices 12a-c. The personal computer 60 may be communicatively connected through the computer network 15 to the game marketing server 17 for the purpose of accessing the available game-types and play options. Alternatively, the personal computer 60 may be loaded with the necessary data and software for the purpose of accessing the available game-types and play options. The printer 62 may be configured to print the respective play card 30 in a similar manner as the game selection device 12a.

The game marketing server 17 may be a centralized computer into which a game selection device 12c may be connected to a number of decentralized computers that connect to the game selection device 12c. However, the game marketing server 17 is not in communication with the central lottery system computer 16. As shown in FIG. 2, the game marketing server 17 may be in communication with the game selection device 12c by utilizing the computer network 15. More specifically, the existing lottery network infrastructure that allows for communication from the lottery sales device 14a inside the supermarket 56 to the central lottery system computer 16 is utilized by the game marketing server 17 to communicate with the game selection device 12c. Thus, any communications from the game marketing server 17 "piggybacks" onto the existing lottery network infrastructure, which is already utilized for the transmission of lottery ticket transactions. Telecommunication routing processors at the appropriate junctions along the existing lottery network infrastructure would route the game selection device output to the game marketing server 17. For game marketing system output to the game selection device 12*c*, the routing would be reversed. The operation of network overlays and routing is well known in the art and will, therefore, not be discussed herein.

The game marketing server 17 may be responsible for transmitting game marketing output including, but not limited to, marketing graphics to the user interface of the game selection device 12*c*. Additionally, the game marketing server 17 may be configured to transmit data to the game selection device 12*c* to ensure that the player's game selection inputs or other player inputs such as input of player identification information are entered by the player to ensure proper game selection output. This game selection device output will be used to communicate the output of the player input to the player via the play card 30 and communicate the output of the player input to the lottery sales devices 14*a*, 14*b* via the play card 30. The game marketing server 17 may also be configured to allow changes in game offerings and marketing program structures relating to content and information displayed on the game selection device 12*c*. The game marketing server 17 may also support collection and analysis of player input such as play options, survey responses, contests, etc., to increase the effectiveness of lottery marketing and game development programs. Furthermore, surveys, player reward notifications, and advertising, both lottery and retailer-based, may be transmitted by the game marketing server 17. Similarly, it is to be understood that the game selection device 12*c* is not limited in what may be transmitted to the game marketing server 17. For example, the game selection device 12*c* may transmit retailer store identification, survey responses, sweepstakes or contest entries, second chance lottery drawing entry information, coupon identification information from direct mail or other sources that allow the player to receive free or price off ticket plays, etc.

As previously discussed, in addition to scanning traditional play slips, the lottery sales device 14*a* is configured to scan the bar code 42 of the play card 30. However, since a traditional bar code may not be able to accommodate the data representative of the game types and corresponding play options that are selected by a player, other bar code types (e.g., extended, enhanced, or other two-dimensional bar code formats such as PDF417) may need to be implemented in the context of the present invention. The drawback to introducing a new type of bar code is the limitation of existing lottery sales devices only having reading compatibility with traditional bar codes. Essentially, the lottery sales device 14*a* does not include a two-dimensional bar code reader having the necessary hardware and software to scan and process two-dimensional bar codes. Thus, the lottery sales device 14*a* cannot decode and communicate the output of the game selection device 12*a* into the lottery sales device 14*a* and to the central lottery system computer 16 if a two-dimensional bar code is printed on the play card 30. A similar limitation is present with the use of smart cards that include encoded player data including, but not limited to, game types and corresponding play options.

Figure 4:
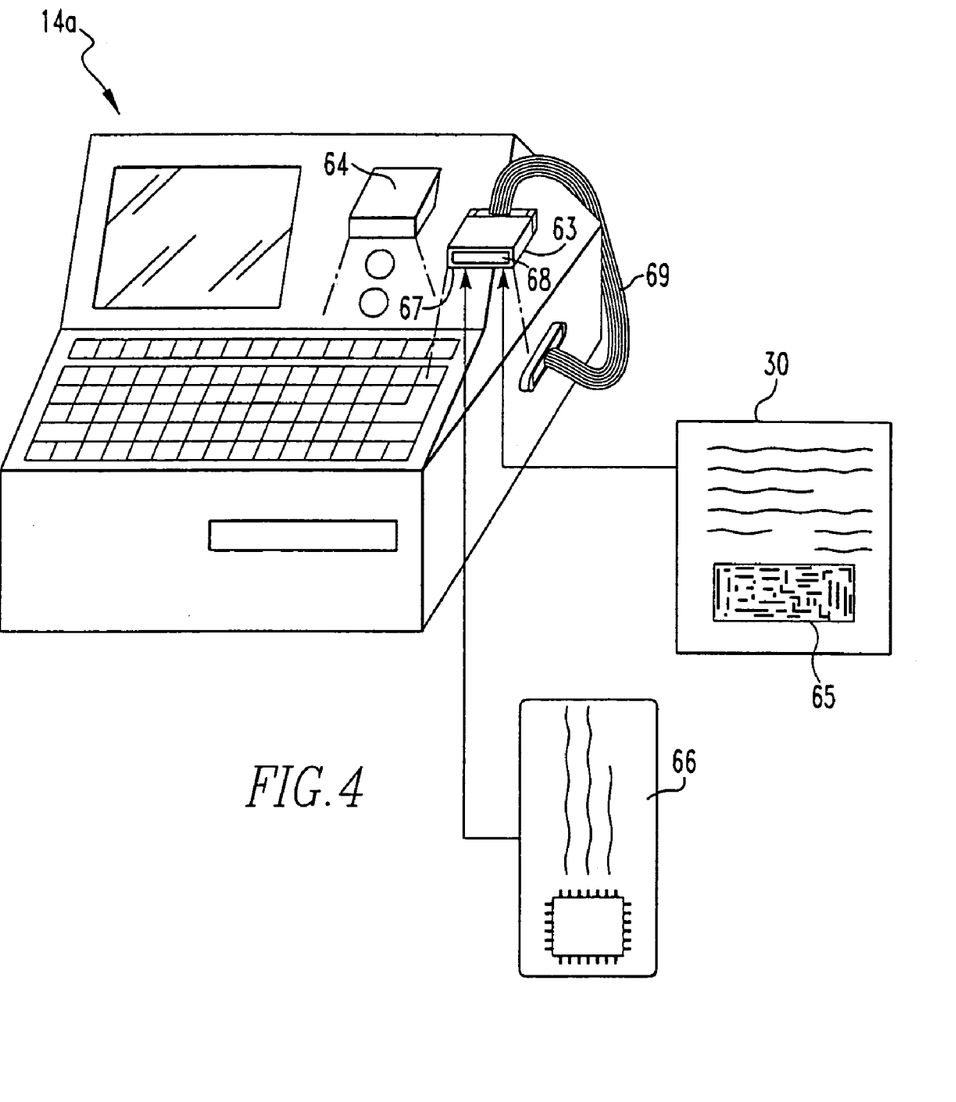
FIG. 4 is front perspective view of a lottery sales device utilizing an additional scanning device.

The present invention therefore includes, as shown in FIG. 4, a scanning device 63, in addition to a scanner 64 inherent in existing lottery sales devices, in operative communication with the lottery sales device 14*a*. Specifically, the scanning device 63 is configured to scan alternative bar code formats 65, smart cards 66, or other player cards, decode the encoded game types and corresponding play option data, translate the data into a format or data that is compatible with data protocols used by the existing the lottery sales device, and then transfer the translated data to the lottery sales device 14*a*. The translated data may then be processed by the lottery sales device 14*a* in a similar manner as would be data the lottery sales device 14*a* received from traditional inputs, such as standard manually marked play slips or clerk entries. The scanning device 63 may be constructed as a unitary piece or a combination of functional parts, either of which are desirably removably attached to the lottery sales device 14*a*. However, it is to be understood that the scanning device 63 may be external to the lottery sales device 14*a*, integrated within the lottery sales device 14*a*, or may be situated within the vicinity of the lottery sales device 14*a* in order to provide convenient access to the scanning device 63 to the clerk while operating the lottery sales device 14*a*. Furthermore, the scanning device 63 may be in wireless communication with the lottery sales device 14*a*. The scanning device 63 includes an extended bar code reader 67 and a smart card reader 68 for scanning the alternative bar code format 65 of the play slip 30 and the smart card 66, respectively. It is to be understood that the bar code reader 67 and the smart card reader 68 include associated hardware and software components (not shown) that are desirably housed within the scanning device 63. For example, the smart card reader 68 may include a slot for insertion of the smart card 66. These hardware and software components are configured to decode the encoded game types and corresponding play option data, translate the data into the format that is compatible with the data protocols used by the lottery sales device 14*a*, and then transfer the translated data to the lottery sales device 14*a*. A data connector or cable 69 interfaces the scanning device 63 to the lottery sales device 14*a* through one or more I/O ports on the scanning device 63 and the lottery sales device 14*a*. Thus, in operation, after the two-dimensional bar code 65 and/or the smart card 66 have been scanned by the scanning device 63, the lottery sales device 14*a* receives the data represented by or stored on the two-dimensional bar code 65 or smart card 66, respectively. Thus, it is to be understood that any data translation, conversion, or other manipulation is dynamically performed by the scanning device 63.

Figure 5:
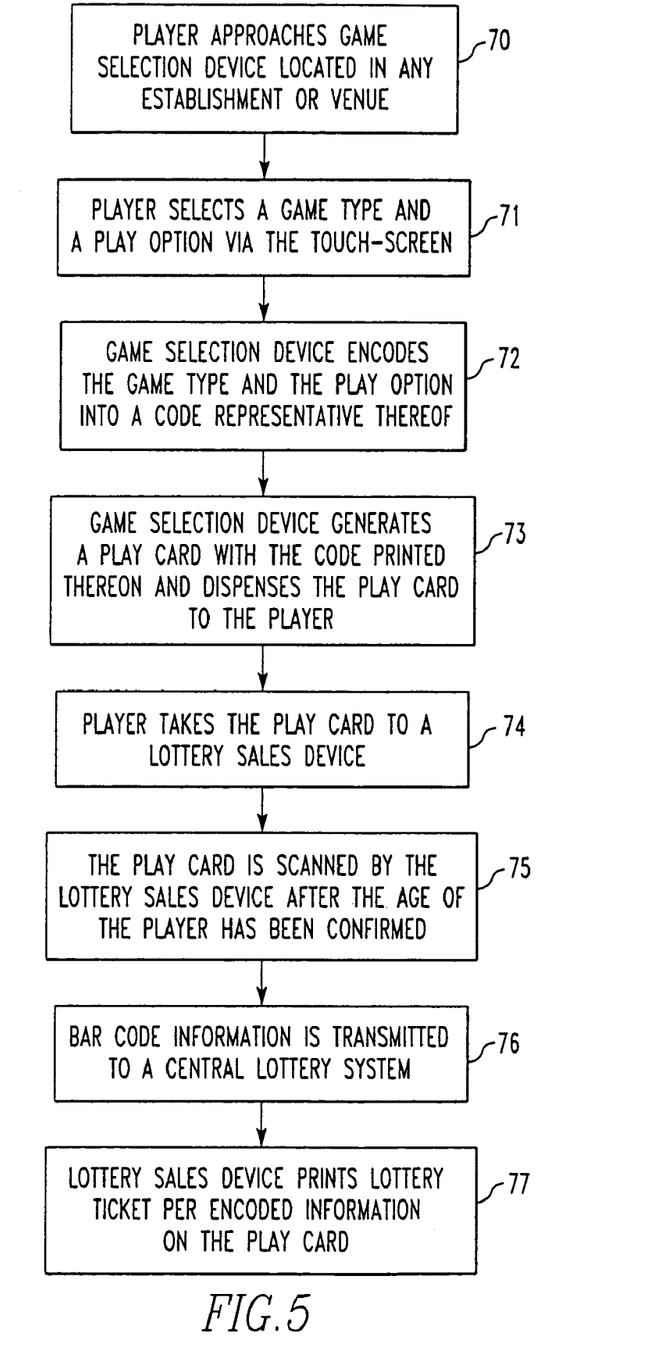
FIG. 5 is a flow chart setting forth the basic steps of a method of marketing lottery games in the lottery system in accordance with a preferred embodiment of the invention.

With reference to FIG. 5 and with continuing reference to FIGS. 2-4, the basic steps of the method of marketing lottery games in accordance with the system described above is shown. First, any lottery player 18*a-c* approaches any game selection device 12*a-c* in any establishment 52, 54, 56, 58, as shown in block 70. For example, player 18*a* may enter the restaurant 52 and approach the game selection device 12*a*. Second, the player 18*a* selects one or more game types and play options associated with the respective game types, as shown in block 71. For example, the lottery player 18*a* may select the following game types via the touch-screen interface 24 of the game selection device 12*a*: "Pick 5", "Anytown VFD raffle", "Instant Win", and "Shapes" and the play options associated with each game type. Third, the game selection device 12*a* encodes the game types and the play options into a code representative of the game types and the play options, as shown in block 72. Fourth, the game selection device 12*a* generates a play card with the game types, play options, lottery rules and regulations, and code printed thereon, and dispenses the play card to the player 18*a*, as shown in block 73. For example, the play card 30 shows that "Pick 5", "Anytown VFD raffle", "Instant Win", and "Shapes" were selected by the player 18*a*. Additionally, the identifying header 32, bar code 42, and informative footer 34 are also printed on the play card 30. Fifth, the player 18*a* takes the play card 30 to any lottery sales device 14a, 14b, as shown in block 74. For example, the player 18a enters the convenience store 57 and approaches the clerk 20b who is responsible for operation of the lottery sales device 14b. Sixth, the play card is scanned through the lottery sales device 14b by the clerk 20b after the age of the player 18a has been confirmed, as shown in block 75. Seventh, the information contained in the bar code 42 is transmitted as an electronic record to the central lottery system computer 16 through the computer network 15, as shown in block 76. Finally, the lottery sales device 14b prints lottery tickets for the player 18a listing the game types and corresponding play options that he or she has selected per the encoded information of the play card 30, as shown in block 77. For example, the tickets that the player 18a receives are; 1) a ticket showing the numbers "8, 11, 19, 27, and 33" as chosen for the "Jul. 7, 2005" drawing of the "Pick 5" Lottery; 2) a ticket indicating that the ticket is "Stub: 471" in the "Anytown VFD Raffle" which will be held on Jul. 9, 2005; 3) an instant win ticket that corresponds to the play style and theme of the instant game selected at the game selection device and is printed with a winning or losing configuration of instant win game symbols and prizes; and 4) a ticket indicating a set of shapes as chosen for the "Jul. 6, 2005" drawing of the "Shapes" Lottery. In the case of printing the instant win ticket, each ticket has a code printed thereon that corresponds to the code printed on the play card that corresponds to each instant win game selection.

It is to be understood that to participate in certain lottery games, personal information may be required of the player 18a and may be passed along to the lottery. For example, a name, address, and contact number of the player 18a may be passed along to the lottery at the time the player 18a selects the raffle ticket via the game selection device 12a and enters such information. This information is used to contact the player 18a if he or she is chosen as the raffle winner. Any personal information collected by the lottery through the game selection device 12a may be used for direct marketing purposes or for identifying repeat players. For example, a repeat player may be offered targeted advertising during the time he or she operates the game selection device 12a, or a free ticket may be offered by the game selection device 12a as a bonus to players who play on their birthday. It is to be understood that the personal information may be securely stored, maintained, and processed on the game marketing server 17.

Figure 6:
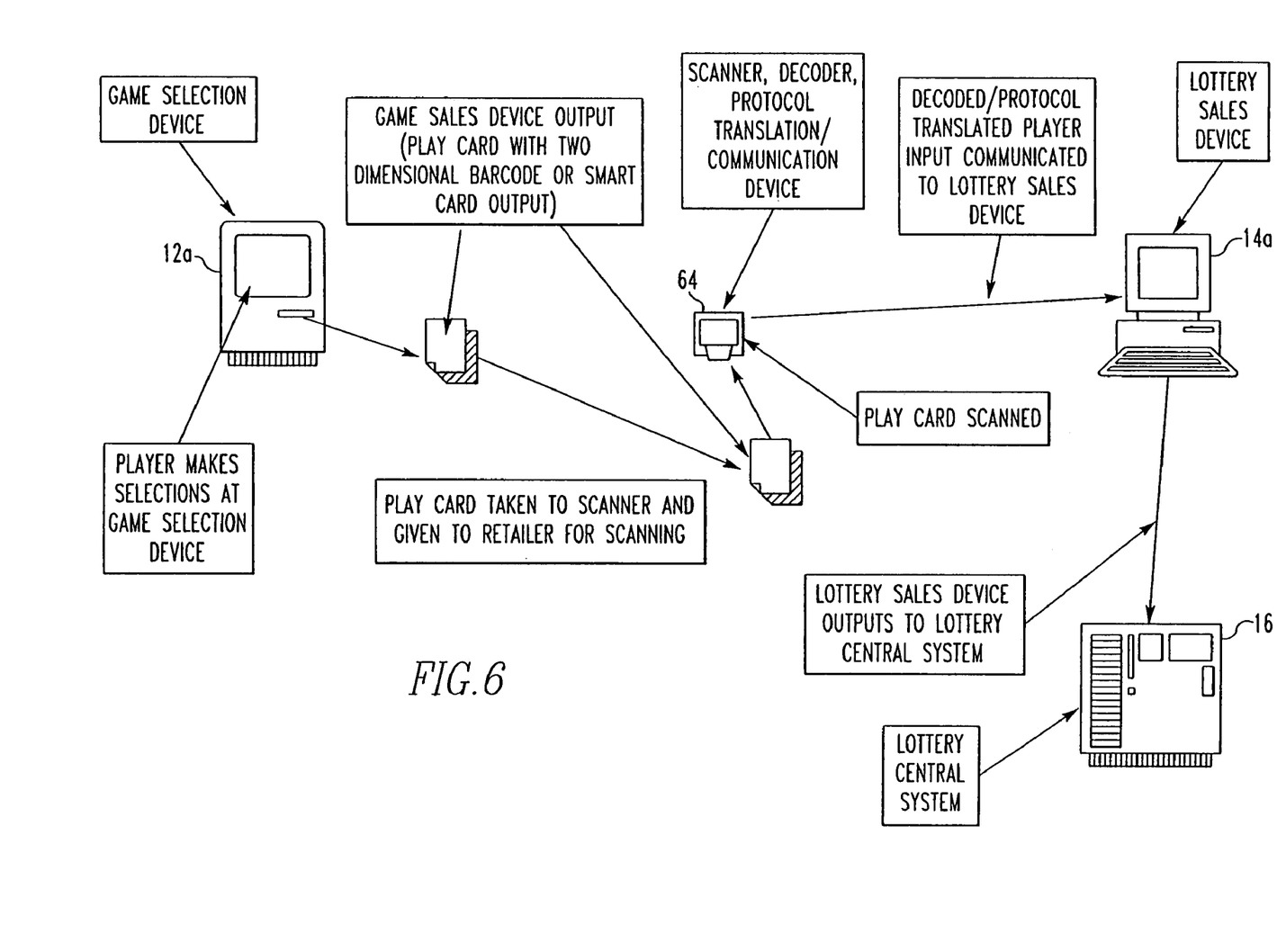
FIG. 6 is a diagram showing the basic steps outlined in FIG. 5 in the context of a scanning device for reading a two-dimensional type bar code or smart card.

The game selection devices 12a-c may be updated with additional game types and play options and/or improved playability and graphics capabilities. Updates may occur on a periodic or continual basis through manual uploads by service personnel to each game selection device 12a-c. Alternatively, if any of the game selection devices 12a-c supports network capabilities, either hard-wired or wireless, then it is envisioned that those game selection devices 12a-c may be updated automatically without direct personnel interaction. For example, the game types and corresponding play options residing on the game selection device 12c may be updated via an electronic update transmitted from the game marketing server 17 through the computer network 15 and the existing lottery network infrastructure into the supermarket 56 and then to the game selection device 12c. FIG. 6 shows the basic steps outlined above in the context of the scanning device 64 utilized in conjunction with the lottery sales device 14a and the game selection device 12a.

It is envisioned that the game-selection devices 12a-c may provide useful game marketing information to prospective players including, but not limited to, past winning number trends (e.g., hot vs. cold numbers), related jackpot trends, and merchant-specific winning statistics. It is also envisioned that existing devices with consumer input and printing capabilities may be retrofitted to serve as functional equivalents to the game selection devices discussed herein. Such retrofitted devices may include, but are not limited to, ATM terminals, gas pumps featuring pay-at-the-pump capabilities, and interactive mall kiosks.

Furthermore, in the context of networked game selection devices 12a-c, the lottery may conduct live drawings which are simul-cast on the game selection devices 12a-c. Similarly, the game selection devices 12a-c may be utilized by a player to play a specific lottery game that is offered at various times, which may be game selection device specific. Thus, as shown and described herein, the game selection devices 12a-c maximize player interaction with the lottery and are able to draw more players into a lottery's customer base.

It is to be understood that the game selection devices 12a-c may be managed by an entity other than the entity responsible for the implementation of the lottery system 10. For example, it is envisioned that the revenue streams of the present invention involve a fee for each lottery transaction or a lump sum right to use each game selection device 12a-c in a particular establishment or venue.

The above invention has been described with reference to the preferred and alternative embodiments. Obvious modifications, combinations, and alterations will occur to others upon reading the preceding detailed description. It is intended that the invention be construed as including all such modifications, combinations, and alterations insofar as they come within the scope of the appended claims or the equivalents thereof.

The invention claimed is:

1. A lottery system for game selection by a user, the lottery system comprising:
 a game selection device, wherein the game selection device is comprised of:
  a.) data storage for:
   (i) information corresponding to a plurality of games; and
   (ii) game play options;
  b.) a user interface configured to:
   (i) display identification information pertaining to one or more of the plurality of games and at least one play option associated with each displayed game; and
   (ii) receive at least one game selection input from the user;
  c.) an encoder for encoding the at least one game selection input as a code; and
  d.) a code writer for writing the code onto at least one play card; and
 a game marketing server, wherein the game marketing server is not communicatively connected at any time to a central lottery system computer and no physical communication link exists therebetween, wherein the game selection device is not communicatively connected at any time to the central lottery system computer and no physical communication link exists therebetween, further wherein the game marketing server is configured to:
 transmit game data to the game selection device, wherein the game data is additional games and corresponding play options operative on the game selection device; and
 receive player data from the game selection device.

2. The lottery system of claim 1, wherein the plurality of games are traditional lottery drawing games.

3. The lottery system of claim 1, wherein the plurality of games are two or more of:
- raffle games;
- regional non-statewide games;
- multi-jurisdiction games;
- permutation games;
- non-number games;
- combination games; and
- instant win online games.

4. The lottery system of claim 1, wherein the game play options comprise one or more of:
- numbers to be played;
- objects to be played;
- drawing dates to be played;
- amount of games to be played; and
- amount to be wagered.

5. The lottery system of claim 1, wherein the game selection device is situated in a retail establishment.

6. The lottery system of claim 5, wherein the at least one of the plurality of games is a co-branded game associated with the retail establishment.

7. The lottery system of claim 5, wherein the at least one of the plurality of games is a co-branded game associated with a product sold in the retail establishment.

8. The lottery system of claim 1, wherein the code is one of a bar code and an alphanumeric code.

9. The lottery system of claim 1, further comprising a discrete sales device physically removed from the game selection device, wherein the sales device is configured to retrieve the code from the play card.

10. The lottery system of claim 9, wherein the sales device is configured to transmit the at least one game selection input as an electronic record to the central lottery system computer.

11. The lottery system of claim 9, wherein the sales device is configured to associate the at least one of the plurality of games and the at least one play option with a player record.

12. The lottery system of claim 11, wherein the player record is one of:
- a paper ticket having the at least one of the plurality of games and the at least one play option printed thereon;
- a smart card having the at least one of the plurality of games and the at least one play option stored therein; and
- a player card having an identifier, wherein the identifier corresponds to the electronic record of the computer system.

13. The lottery system of claim 9, wherein the sales device is a remotely located lottery managed computer system.

14. The lottery system of claim 9, wherein the code is one of:
- an enhanced bar code on a play card;
- digital data stored on a player card; and
- digital data stored on a smart card.

15. The lottery system of claim 14, further comprising a scanning device interfaced to the sales device, wherein the scanning device includes at least one of:
- an enhanced bar code scanner configured to scan the enhanced bar code from the play card;
- a reader configured to read the player card; and
- a smart card reader configured to read the smart card.

16. The lottery system of claim 15, wherein the scanning device is configured to:
- decode the at least one of the plurality of games and at least one play option;
- translate the decoded at least one of the plurality of games and the at least one play option into data compatible with the sales device; and
- transmit the data to the sales device.

17. The lottery system of claim 16, wherein the scanning device is attached to the sales device.

18. The lottery system of claim 1, wherein the game selection device is a personal computer.

19. The lottery system of claim 1, wherein the game selection device is one of an ATM terminal, gas pump, and a kiosk.

20. The lottery system of claim 1, wherein the game data further includes:
- marketing graphics for display on the user interface of the game selection device;
- surveys;
- player reward notifications; and
- advertising.

21. The lottery system of claim 20, wherein the player data is at least one of:
- player identification information, wherein the player identification information uniquely identifies each player;
- game selection input;
- play option selection input; and
- marketing data.

22. The lottery system of claim 21, wherein the game marketing server is configured to transmit the game data in response to player identification information received by the game marketing server.

23. The lottery system of claim 1, wherein the user interface includes a touch-screen.

24. The lottery system of claim 1, wherein the game marketing server is communicatively connected to the game selection device.

25. A method for game marketing and game selection in a lottery system comprising the steps of:
- a.) providing a game selection device having a user interface;
- b.) storing information corresponding to a plurality of games in the game selection device;
- c.) displaying information to identify one or more games and at least one play option associated with each displayed game;
- d.) receiving a game selection input from the user via the user interface, wherein the game selection input corresponds to at least one of the plurality of games stored in the game selection device;
- e.) receiving a play option selection input from the user via the user interface, wherein the play option selection input corresponds to at least one play option associated with the at least one of the plurality of games selected by the user;
- f.) encoding the at least one game selection input and the at least one play option as a code;
- g.) writing the code onto a play card;
- h.) providing a game marketing server, further wherein the game selection device is configured to:
  - transmit game data to the game selection device, wherein the game data is additional games and corresponding play options operative on the game selection device; and
  - receive player data from the game selection device;
- i.) carrying the play card to a physically removed sales device, wherein the sales device is configured to retrieve the code from the play card; and
- j.) transmitting the at least one game selection input and the at least one play option as an electronic record to a computer system, wherein the computer system is a central lottery system computer, wherein the game marketing server is not communicatively connected at any time to a central lottery system computer and no physical communication link exists therebetween, and wherein the game selection device is not communicatively connected at any time to the central lottery system computer and no physical communication link exists therebetween.

26. The method of claim 25, further comprising the step of interfacing a scanning device with the sales device, wherein the scanning device is external to the sales device.

27. The method of claim 26, further comprising the steps of:
 a.) scanning or reading the code from the play card;
 b.) decoding the at least one of the plurality of games and the at least one play option represented by the code;
 c.) translating the decoded at least one of the plurality of games and the at least one play option into data compatible with the sales device; and
 d.) transmitting the data to the sales device.

28. The method of claim 25, wherein the game marketing server is communicatively connected to the game selection device.

* * * * *